United States Patent
Chen

(10) Patent No.: US 9,712,632 B2
(45) Date of Patent: Jul. 18, 2017

(54) METHOD FOR RECEIVING DATA, METHOD FOR SENDING DATA, MOBILE TERMINAL, AND SERVER

(71) Applicant: Huawei Device Co., Ltd., Shenzhen (CN)

(72) Inventor: Guoqiao Chen, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 502 days.

(21) Appl. No.: 14/145,496

(22) Filed: Dec. 31, 2013

(65) Prior Publication Data

US 2014/0115125 A1   Apr. 24, 2014

Related U.S. Application Data

(63) Continuation of application No. PCT/CN2012/079101, filed on Jul. 24, 2012.

(30) Foreign Application Priority Data

Dec. 27, 2011   (CN) .......................... 2011 1 0444013

(51) Int. Cl.
*H04L 29/08* (2006.01)
*H04W 76/04* (2009.01)
*H04W 4/20* (2009.01)

(52) U.S. Cl.
CPC ........... *H04L 67/26* (2013.01); *H04W 76/045* (2013.01); *H04W 4/20* (2013.01); *Y02B 60/50* (2013.01)

(58) Field of Classification Search
CPC ...... H04L 67/26; H04W 76/045; H04W 4/20; Y02B 60/50
USPC .......................................................... 709/219
See application file for complete search history.

(56) References Cited

U.S. PATENT DOCUMENTS 7,930,366 B2 * 4/2011 Sakaguchi ............. G06Q 30/02
709/203
2004/0203712 A1 * 10/2004 Murai ................ H04N 7/17318
455/422.1
(Continued)

FOREIGN PATENT DOCUMENTS

CN   1585372 A   2/2005
CN   1705268 A   12/2005
(Continued)

OTHER PUBLICATIONS

Per Ljung, Opportunities for Energy Savings in Mobile Devices, 2011, IEEE.*

(Continued)

*Primary Examiner* — Brian J Gillis
*Assistant Examiner* — Steve Lin
(74) *Attorney, Agent, or Firm* — Conley Rose, P.C.

(57) ABSTRACT

A method for receiving data, a method for sending data, a mobile terminal, and a server are disclosed. The method includes: when an application program on a mobile terminal is switched to a background, sending, by the mobile terminal, a first message to a push server, so that the push server sends a second message to an application server, where the second message is used to instruct the application server to send, when there is data that needs to be sent to the mobile terminal, the data to the push server, and the application server serves the application program; and receiving, by the mobile terminal, the data sent by the push server. Through the present invention, the mobile terminal does not need not maintain a heartbeat connection to the application server, thereby reducing signaling overhead of the mobile terminal and reducing energy consumption.

38 Claims, 10 Drawing Sheets

When an application program on a mobile terminal is switched to a background, the mobile terminal sends a first message to a push server, so that the push server sends a second message to an application server, where the second message is used to instruct the application server to send, when there is data that needs to be sent to the mobile terminal, the data to the push server, and the application server serves the application program — 101

The mobile terminal receives the data sent by the push server — 102

(56) References Cited

U.S. PATENT DOCUMENTS

| | | | | | |
|---|---|---|---|---|---|
| 2007/0197196 | A1* | 8/2007 | Shenfield | ................ | H04L 67/26 455/412.2 |
| 2007/0239884 | A1* | 10/2007 | Karmakar | ................ | H04L 67/26 709/232 |
| 2009/0158397 | A1* | 6/2009 | Herzog | ................ | H04L 12/5895 726/4 |
| 2009/0252072 | A1* | 10/2009 | Lind | ................... | H04W 76/045 370/311 |
| 2011/0173681 | A1* | 7/2011 | Qureshi | ............. | H04L 63/0823 726/4 |
| 2012/0110173 | A1* | 5/2012 | Luna | ....................... | H04L 69/28 709/224 |
| 2013/0029692 | A1* | 1/2013 | Liang | ..................... | G06Q 30/02 455/456.3 |
| 2013/0159395 | A1* | 6/2013 | Backholm | ......... | H04L 29/08099 709/203 |
| 2014/0136604 | A1* | 5/2014 | Lee | ......................... | H04L 67/02 709/203 |

FOREIGN PATENT DOCUMENTS

| | | |
|---|---|---|
| CN | 102209302 A | 10/2011 |
| EP | 1841130 A1 | 10/2007 |

OTHER PUBLICATIONS

Partial English Translation and Abstract of Chinese Patent Application No. CN1705268A, Feb. 20, 2014, 3 pages.

Partial English Translation and Abstract of Chinese Patent Application No. CN102209302A, Feb. 20, 2014, 4 pages.

Partial English Translation and Abstract of Chinese Patent Application No. CN1585372A, Part 1, Feb. 20, 2014, 3 pages.

Partial English Translation and Abstract of Chinese Patent Application No. CN1585372A, Part 2, Feb. 20, 2014, 3 pages.

Foreign Communication From a Counterpart Application, PCT Application No. PCT/CN2012/079101, English Translation of International Search Report dated Nov. 8, 2012, 2 pages.

Foreign Communication From a Counterpart Application, PCT Application No. PCT/CN2012/079101, English Translation of Written Opinion dated Nov. 8, 2012, 16 pages.

Ljung P., "Opportunities for Energy Savings in Mobile Devices," 2011 IEEE 22nd International Symposium on Personal, Indorr and Mobile Radio Communications, XP32102350, Sep. 11-14, 2011, pp. 2394-2401.

"3rd Generation Partnership Project; Technical Specification Group Services and System Aspects; Push Architecture (Release 10)," 3GPP TR 23.976, V10.0.0, Technical Report, XP050547972, Mar. 2011, 36 pages.

3rd Generation Pertnership Project; Technical Specification Group Services and System Aspects; Study on non-MTC Mobile Data Applications Impacts (Release 12), 3GPP TR 22.801 V12.0.0, XP050555043, Dec. 2011, 22 pages.

"Push Proxy/Device Agent Function for reducing heartbeat/keep-alive of applications," SA WG2 Temporary Document, SA WG2 Meeting #96, S2-131498, XP050708682, Apr. 8-12, 2013, 4 pages.

Foreign Communication From a Counterpart Application, European Application No. 12861348.6, Extended European Search Report dated Sep. 2, 2014, 14 pages.

* cited by examiner

METHOD FOR RECEIVING DATA, METHOD FOR SENDING DATA, MOBILE TERMINAL, AND SERVER

CROSS-REFERENCE TO RELATED APPLICATIONS

This application is a continuation of International Application No. PCT/CN2012/079101, filed on Jul. 24, 2012, which claims priority to Chinese Patent Application No. 201110444013.4, filed on Dec. 27, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of mobile terminals, and in particular, to a method for receiving data, a method for sending data, a mobile terminal, and a server.

BACKGROUND

For applications on a current mobile terminal such as a smart phone or a tablet, especially some applications related to mobile Internet including instant messaging (IM), electronic mail (Email), social networking services (SNS) and the like, the mobile terminal needs to communicate with an application server on a network side in real time. In the prior art, when an application program runs in a background of the mobile terminal, heartbeat signaling is sent at a small time interval between the mobile terminal and the application server, so as to ensure that the application server constantly refreshes Internet Protocol (IP) address information of the mobile terminal, and to utilize this mechanism to maintain long-term effectiveness of an IP connection between the mobile terminal and the application server, and moreover, to instantly establish an IP connection when there is no IP connection between the mobile terminal and the server. The application server sends relevant service data of the application program to the mobile terminal through the IP connection.

However, when the application program runs in the background, the mobile terminal needs to send the heartbeat signaling to the application server all the time to maintain a heartbeat connection, which leads to a huge waste of signaling.

SUMMARY

To reduce a signaling storm for a mobile terminal, embodiments of the present invention provide a method for receiving data, a method for sending data, a mobile terminal, and a server. The following technical solutions are provided:

A method for receiving data includes: when an application program on a mobile terminal is switched to a background, sending, by the mobile terminal, a first message to a push server, so that the push server sends a second message to an application server, where the second message is used to instruct the application server to send, when there is data that needs to be sent to the mobile terminal, the data to the push server, and the application server serves the application program; and receiving, by the mobile terminal, the data sent by the push server.

A method for sending data includes: receiving, by a push server, a first message sent by a mobile terminal; sending, by the push server, a second message to an application server according to the first message, where the second message is used to instruct the application server to send, when there is data that needs to be sent to the mobile terminal, the data to the push server; and sending, by the push server the data to the mobile terminal when receiving the data sent by the application server.

A method for sending data includes: receiving, by an application server, a second message sent by a push server; and when there is data that needs to be sent to the mobile terminal, sending, by the application server, the data to the push server according to the second message, so that the push server sends the data to the mobile terminal after receiving the data.

A mobile terminal includes: a sending module configured to send a first message to a push server when an application program on the mobile terminal is switched to a background, so that the push server sends a second message to an application server, where the second message is used to instruct the application server to send, when there is data that needs to be sent to the mobile terminal, the data to the push server, and the application server serves the application program; and a receiving module configured to receive the data sent by the push server.

A push server includes: a receiving module configured to receive a first message sent by a mobile terminal; and a sending module configured to send a second message to an application server according to the first message, where the second message is used to instruct the application server to send, when there is data that needs to be sent to the mobile terminal, the data to the push server; where the sending module is further configured to send the data to the mobile terminal when receiving the data sent by the application server.

An application server includes: a receiving module configured to receive a second message sent by a push server; and a sending module configured to: when an application program indicated by a user identification and an application program identification needs to send data to a mobile terminal, send the data to the push server according to the second message, so that the push server sends the data to the mobile terminal after receiving the data.

A network system includes: a mobile terminal configured to send a first message to a push server when an application program on the mobile terminal is switched to a background, so that the push server sends a second message to an application server, where the second message is used to instruct the application server to send, when there is data that needs to be sent to the mobile terminal, the data to the push server, and the application server serves the application program; and receive the data sent by the push server; the push server configured to receive the first message sent by the mobile terminal; send the second message to the application server according to the first message, where the second message is used to instruct the application server to send, when there is data that needs to be sent to the mobile terminal, the data to the push server; and send the data to the mobile terminal when receiving the data sent by the application server; and the application server configured to receive the second message sent by the push server; and when an application program indicated by a user identification and an application program identification needs to send data to the mobile terminal, send the data to the push server according to the second message, so that the push server sends the data to the mobile terminal after receiving the data.

A method for receiving data includes: when an application program on a mobile terminal is switched to a background, sending, by the mobile terminal, a registration message to a proxy server, so that the proxy server maintains a heartbeat connection to an application server according to the registration message and receives data to be delivered by the application server to the mobile terminal, where the application server serves the application program; and receiving, by the mobile terminal, the data forwarded by the proxy server.

A method for sending data includes: receiving, by a proxy server, a registration message sent by a mobile terminal; maintaining by the proxy server, a heartbeat connection to an application server according to the registration message; and sending, by the proxy server, the data to the mobile terminal after receiving data sent by the application server.

A mobile terminal includes: a sending module configured to send a registration message to a proxy server when an application program on the mobile terminal is switched to a background, so that the proxy server maintains a heartbeat connection to an application server according to the registration message and receives data to be delivered by the application server to the mobile terminal, where the application server serves the application program; and a receiving module configured to receive the data forwarded by the proxy server.

A proxy server includes: a receiving module configured to receive a registration message sent by a mobile terminal; a heartbeat module configured to maintain a heartbeat connection to an application server according to the registration message; and a sending module configured to send the data to the mobile terminal after receiving data sent by the application server.

A network system includes: a mobile terminal configured to send a registration message to a proxy server when an application program on the mobile terminal is switched to a background, so that the proxy server maintains a heartbeat connection to an application server according to the registration message and receives data to be delivered by the application server to the mobile terminal, where the application server serves the application program; and receive the data forwarded by the proxy server; the proxy server configured to receive the registration message sent by the mobile terminal; maintain the heartbeat connection to the application server according to the registration message; and send the data to the mobile terminal when receiving the data sent by the application server; and the application server configured to send the data to the proxy server.

The technical solutions provided by the embodiments of the present invention achieve the following beneficial effects:

In a scenario in which a push server or a proxy server is used to keep an application program online, when the application program is switched to a background for running, the push server or the proxy server interacts with an application server, so that a mobile terminal does not need to maintain a heartbeat connection to the application server, thereby not only reducing signaling overhead of the mobile terminal, but also reducing energy consumption of the mobile terminal and interaction of network signaling to a great extent.

BRIEF DESCRIPTION OF THE DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention more comprehensible, the following further describes the embodiments of the present invention in detail with reference to the accompanying drawings.

Figure 1:
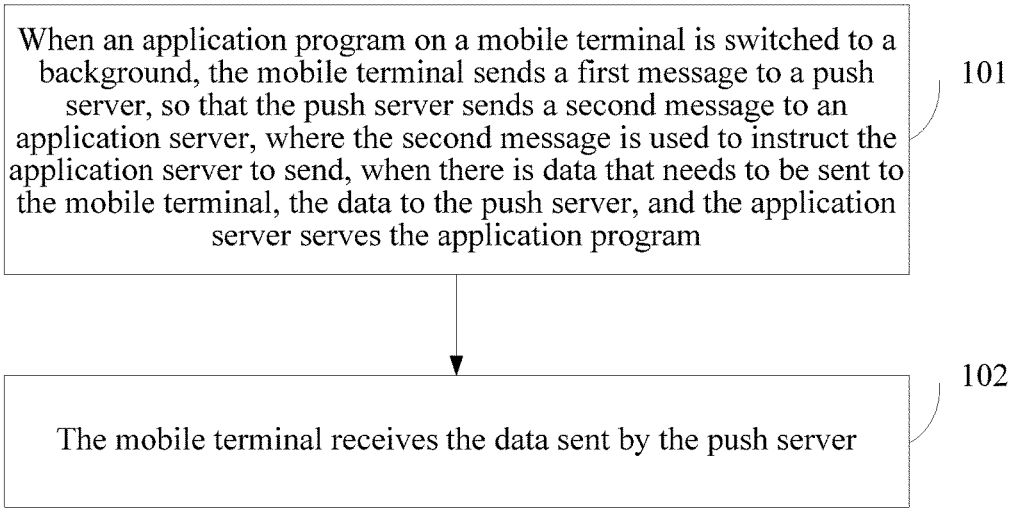
FIG. 1 is a flowchart of a method for receiving data according to an embodiment of the present invention.

FIG. 1 is a flowchart of a method for receiving data according to an embodiment of the present invention. This embodiment is executed by a mobile terminal. Referring to FIG. 1, the method includes:

101: When an application program on a mobile terminal is switched to a background, the mobile terminal sends a first message to a push server, so that the push server sends a second message to an application server, where the second message is used to instruct the application server to send, when there is data that needs to be sent to the mobile terminal, the data to the push server, and the application server serves the application program.

In this embodiment, when the application program on the mobile terminal is switched to the background, the mobile terminal does not maintain a heartbeat connection to the application server through heartbeat signaling, but interacts with the application server through the push server; when receiving the data sent by the application server, the push server sends data to the mobile terminal.

102: The mobile terminal receives the data sent by the push server.

In the method provided in this embodiment, in a scenario in which a push server is used to keep an application program online, when the application program is switched to a background for running, the push server interacts with an application server, so that a mobile terminal does not need to maintain a heartbeat connection to the application server, thereby not only reducing signaling overhead of the mobile terminal, but also reducing energy consumption of the mobile terminal and interaction of network signaling to a great extent.

Figure 2A:
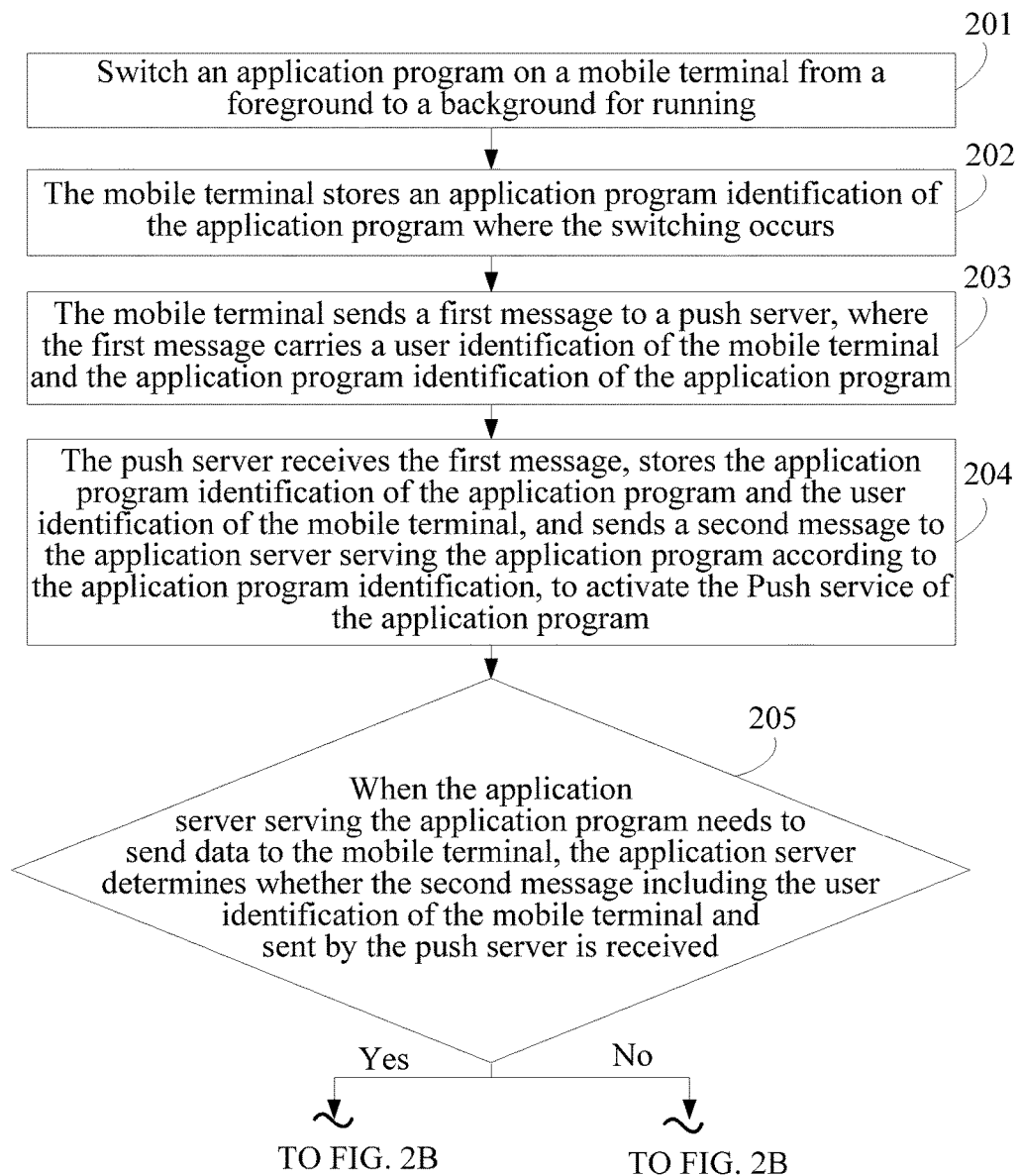
FIG. 2A and FIG. 2B are flowcharts of a method for receiving data according to an embodiment of the present invention.
Figure 2B:
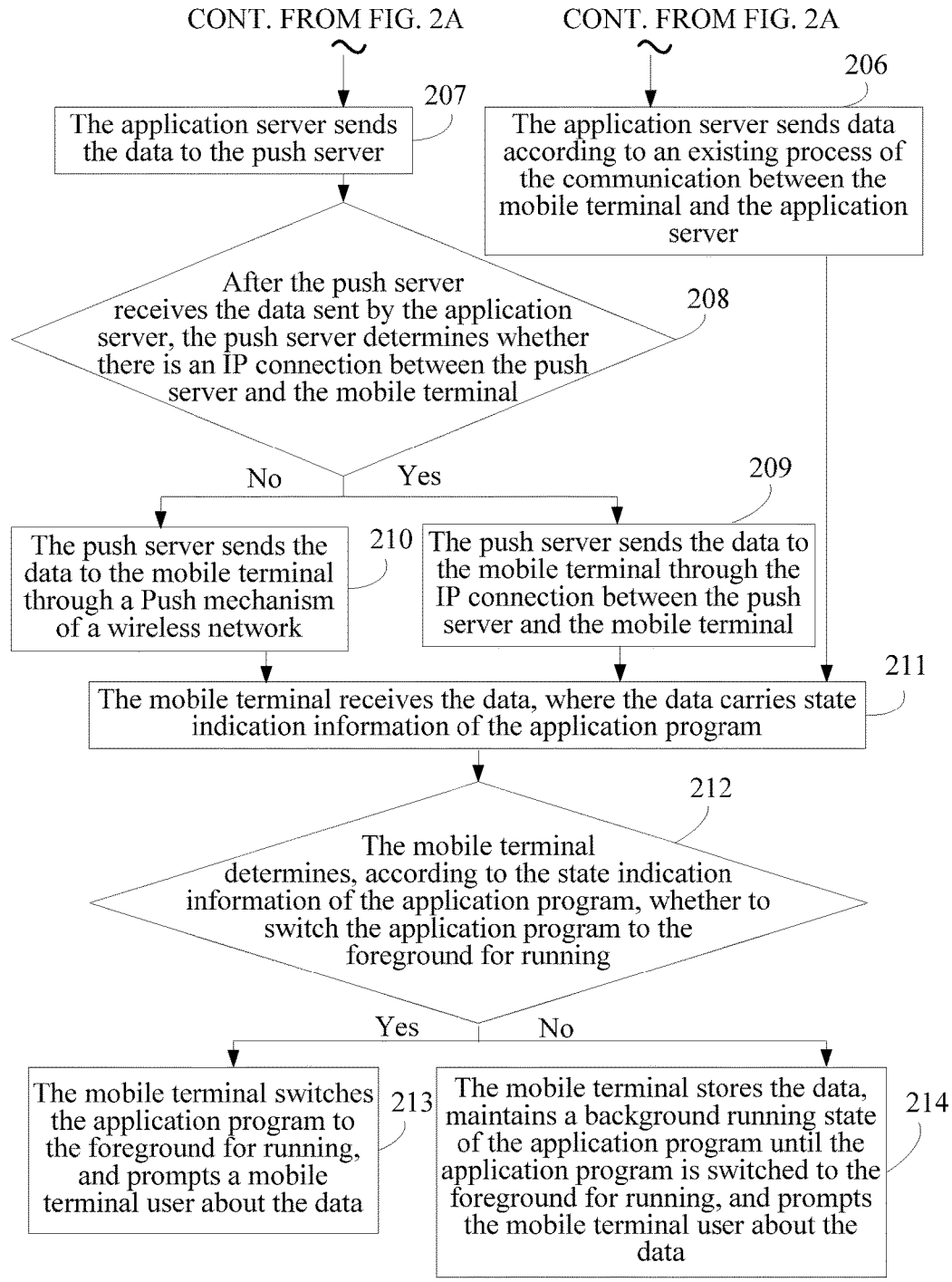

FIG. 2A and FIG. 2B are flowcharts of a method for receiving data according to an embodiment of the present invention. In this embodiment, a communication network includes a mobile terminal, a push server, and an application server. A person skilled in the art may learn that, the mobile terminal may be a mobile phone, a personal digital assistant (PDA), and the like; the push server is generally disposed in an operator server, and performs PUSH pushing through a short message or in other manners; the application server refers to a server for each application program, such as a QQ server or an Email server. The push server may correspond to multiple application servers, and provides a PUSH pushing service for the application servers. Referring to FIG. 2A and FIG. 2B, the method includes:

201: Switch an application program on a mobile terminal from a foreground to a background for running.

In this embodiment, the application program refers to an Internet application program that needs to keep its state updated.

A person skilled in the art may learn that, when the application program is used, the application program may be in one of two states: foreground running or background running. The foreground and the background are relative to a desktop. When being executed in the foreground, that is, on the desktop, the application program can be perceived by a user, while when running in the background, the application program is invisible to the user. Switching between the foreground running and the background running may include any one of the following cases: (1) when the application program running in the foreground is idle for a duration longer than a preset duration, the application program is switched to the background for running, where the preset duration is set by the user, and is not specifically limited in the embodiment of the present invention; (2) after opening a first application program, the user opens a second application program, and at this time, the user can see the second application program but cannot see the first application program, which indicates that the second application program is running in the foreground and the first application program is running in the background.

Further, when the application program is switched from the foreground to the background for running, an IP connection between the mobile terminal and the application server serving the application program is released. A person skilled in the art may learn that, all application programs running in the foreground maintain an available IP connection in a networking state, and data sending and state synchronization of the application programs both use the IP connection. One mobile terminal may establish multiple IP connections, and one application program may establish an IP connection or uses an existing IP connection as required.

It should be noted that, the step of releasing an IP connection may be performed when the switching occurs, and may also be performed in any step after the switching occurs, for example, performed after step 203, which is not specifically limited in the embodiment of the present invention. In this embodiment, after the IP connection of the application program running in the background is released, network resource usage can be reduced.

202: The mobile terminal stores an application program identification of the application program where the switching occurs.

It should be noted that, multiple application programs switched to the background for running may exist on the mobile terminal, and in this case, application program identifications of the multiple application programs are stored, so that received messages and corresponding application programs are distinguished in subsequent steps.

In this embodiment, the application program identification of the application program may be an application identifier (APP ID), and may also be an application program description, for example, QQ or Microsoft Network (MSN).

203: The mobile terminal sends a first message to a push server, where the first message carries a user identification of the mobile terminal and the application program identification of the application program.

The user identification of the mobile terminal may be an identification that is allocated by the application server to the mobile terminal when the mobile terminal registers the application program, where the user identification corresponds to a telephone number of the mobile terminal in a one-to-one relationship.

It should be noted that, the first message may further carry state information of the application program, which is used to notify the push server of a current state of the application program, and after receiving the first message, the push server maintains a mapping relationship list between the state information and the application program identification of the application program.

In this embodiment, step 203 is used to notify the push server of the application program identification of the application program, so that the push server learns that the application program has been switched from the foreground to the background for running, and activates a Push service.

A person skilled in the art may learn that, all push servers described in this embodiment refer to servers with a Push function module, and the push server described herein is not necessarily an independent server, but may also be a function module of another server.

204: The push server receives the first message, stores the application program identification of the application program and the user identification of the mobile terminal, and sends a second message to the application server serving the application program according to the application program identification, to activate a Push service of the application program.

After receiving the application program identification, the push server queries for the application server that serves the application program according to the application program identification, and sends the second message to the application server. The second message includes the user identification of the mobile terminal.

In this embodiment, the second message carries an address identification of the push server and the user identification of the mobile terminal, and is used to instruct the application server to send, when there is data that needs to be sent to the mobile terminal, the data to the push server.

205: When the application server serving the application program needs to send data to the mobile terminal, the application server determines whether the second message including the user identification of the mobile terminal and sent by the push server is received, and if yes, perform step 207; if not, perform step 206.

In this embodiment, the workflow of the application server serving as the application server is changed, so that the application server does not need to maintain a heartbeat with the mobile terminal, but instead, when the application program corresponding to the application program identification and the user identification needs to send data, the application server sends the data to the push server as long as the application server has received the second message including the user identification of the mobile terminal.

206: The application server sends data according to an existing process of the communication between the mobile terminal and the application server, and the procedure proceeds to step 211.

207: The application server sends the data to the push server.

A person skilled in the art may learn that, data interaction between the application server and the pusher server belongs to the prior art, so the details are not repeated herein.

208: After the push server receives the data sent by the application server, the push server determines whether there is an IP connection between the push server and the mobile terminal, and if yes, perform step 209; if not, perform step 210.

209: The push server sends the data to the mobile terminal through the IP connection between the push server and the mobile terminal, and the procedure proceeds to step 211.

210: The push server sends the data to the mobile terminal through a Push mechanism of a wireless network.

In this embodiment, the push server may send the data to the mobile terminal through, for example, short message service (SMS) Push, wireless application protocol (WAP) Push, or the like.

In another embodiment, to further avoid a signaling storm, step 210 may be replaced with the following: if there is no IP connection between the push server and the mobile terminal, the push server determines whether the data is greater than a preset value; if the data is less than the preset value, the push server sends the data to the mobile terminal through a Push mechanism; if the data is greater than or equal to the preset value, the push server sends an IP connection establishment notification to the mobile terminal; and when receiving an IP connection establishment request from the mobile terminal, the push server establishes an IP connection to the mobile terminal, and sends the data to the mobile terminal through the established IP connection. The push server is generally disposed in an operator server, performs PUSH pushing through a short message or in other manners, and can transfer small data without an IP connection, so that data can be transmitted in a case in which no IP connection is established between the mobile terminal and the push server, thereby further reducing signaling overhead of the mobile terminal, and reducing network signaling interaction.

The preset value may be set in advance, and the details are not repeated herein.

It should be noted that, step 209 and step 210 both describe a process where the push server sends a message to the mobile terminal, and in this embodiment, the IP connection between the push server and the mobile terminal may be released after the switching occurs, and may also be released during another step.

211: The mobile terminal receives the data, where the data carries state indication information of the application program.

In this embodiment, the state indication information of the application program is used to indicate a state in which the mobile terminal should run a program, and may be set at the application server.

212: The mobile terminal determines, according to the state indication information of the application program, whether to switch the application program to the foreground for running, and if the application program needs to be switched to the foreground for running, perform step 213; if the application program does not need to be switched to the foreground for running, perform step 214.

213: The mobile terminal switches the application program to the foreground for running, and prompts a mobile terminal user about the data; and the procedure ends.

In this embodiment, the data may further carry a mobile terminal state requirement of the application program, where the mobile terminal state requirement of the application program is used to indicate, to the mobile terminal, whether to run a program in an activated state, which may be set at the application server by technical personnel. Then, when the application program needs to be started, a current state of the mobile terminal further needs to be determined. In one aspect, when the mobile terminal is in a sleep state or a screen-closed state, it is determined whether the mobile terminal state requirement needs to be implemented in the activated state of the mobile terminal. If yes, the mobile terminal is activated, and the user is prompted about the data; if not, the data is stored, and when the mobile terminal is switched to the activated state, the mobile terminal user is prompted about the data. It should be noted that, after delivering each Push message, a network side receives a transmission mark of the Push message, and the network side updates state information of the mobile terminal according to the transmission mark of the Push message. The state information of the mobile terminal is used to indicate whether the state of the mobile terminal is the activated state, the sleep state, or the screen-closed state. In another aspect, when the mobile terminal is in the activated state, the user is prompted about the data.

214: The mobile terminal stores the data, maintains a background running state of the application program until the application program is switched to the foreground for running, and prompts the mobile terminal user about the data.

In this embodiment, the mobile terminal stores the message according to the application program identification of the data, and when the application program indicated by the application program identification is switched from the background to the foreground for running, prompts the user about the data. A person skilled in the art may learn that, there may be multiple prompting methods, including popping up a message or popping up a message prompt on a display screen, which are not specifically limited in the embodiment of the present invention.

In the method provided in this embodiment, in a scenario in which a push server is used to keep an application program online, when the application program is switched to a background for running, the push server interacts with an application server, so that a mobile terminal does not need to maintain a heartbeat connection to the application server, thereby not only reducing signaling overhead of the mobile terminal, but also reducing energy consumption of the mobile terminal and interaction of network signaling to a great extent. Further, in a case where no IP connection for the application program exists, an online function of the mobile terminal is implemented through the Push mechanism, so that the mobile terminal does not need to periodically initiate registration and establish a connection to the application server, thereby avoiding the signaling storm of the mobile terminal.

Figure 3:
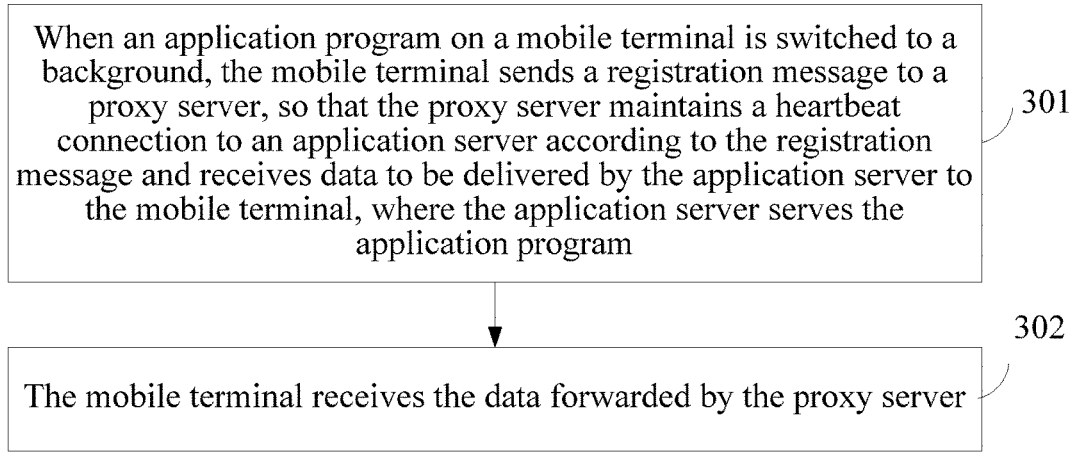
FIG. 3 is a flowchart of a method for receiving data according to an embodiment of the present invention.

FIG. 3 is a flowchart of a method for receiving data according to an embodiment of the present invention. This embodiment is executed by a mobile terminal. Referring to FIG. 3, the method includes:

301: When an application program on a mobile terminal is switched to a background, the mobile terminal sends a registration message to a proxy server, so that the proxy server maintains a heartbeat connection to an application server according to the registration message and receives data to be delivered by the application server to the mobile terminal, where the application server serves the application program.

Registration information carries a user identification of the mobile terminal and an application program identification of the application program.

In this embodiment, the proxy server receives the registration message sent by the mobile terminal, maintains a heartbeat connection to the application server according to the registration message, and when receiving the data sent by the application server, sends the data to the mobile terminal. In this way, a heartbeat connection between the mobile terminal and the application server is transferred to the proxy server, so that the proxy server maintains a heartbeat connection to the application server. Once the application server needs to send data, the application server sends the data to the proxy server, and the proxy server, as a relay, forwards the data to the mobile terminal.

302: The mobile terminal receives the data forwarded by the proxy server.

In the method provided in this embodiment, in a scenario in which a proxy server is used to keep an application program online, when the application program is switched to a background for running, the proxy server interacts with an application server, so that a mobile terminal does not need to maintain a heartbeat connection to the application server, thereby not only reducing signaling overhead of the mobile terminal, but also reducing energy consumption of the mobile terminal and interaction of network signaling to a great extent.

Figure 4:
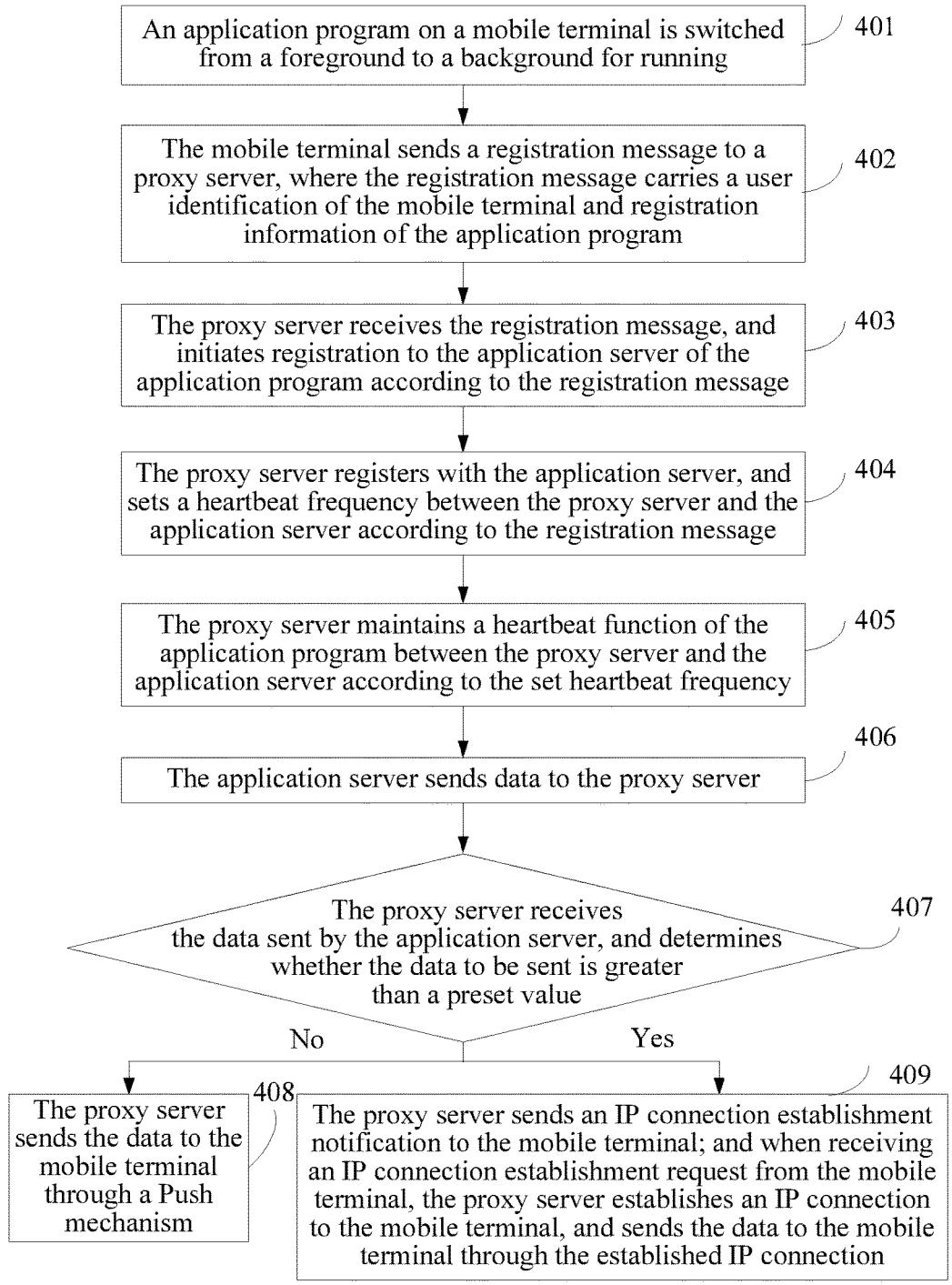
FIG. 4 is a flowchart of a method for receiving data according to an embodiment of the present invention.

FIG. 4 is a flowchart of a method for receiving data according to an embodiment of the present invention. In this embodiment, the interacting parties are a mobile terminal, a proxy server, and an application server, where the proxy server is set by an operator, is connected to the application server, and the proxy server serves the application server. Referring to FIG. 4, the method includes:

401: An application program on a mobile terminal is switched from a foreground to a background for running.

In this embodiment, the mobile terminal learns the switching between the foreground and the background by a same method as that in step 201, so the details are not repeated.

402: The mobile terminal sends a registration message to a proxy server, where the registration message carries a user identification of the mobile terminal and registration information of the application program.

A person skilled in the art may learn that, in the prior art, to maintain the background running of the application program, the mobile terminal needs to periodically register with the application server. In the embodiment of the present invention, the mobile terminal sends a registration message to the proxy server, and the registration message is sent by the proxy server, so that the proxy server bears a registration function of the application program. Preferably, the registration message of the application program carries a user identification of the mobile terminal and an application program identification of the application program, and may further carry application program state information, an application program heartbeat frequency, and the like.

403: The proxy server receives the registration message, and initiates registration to the application server of the application program according to the registration message.

In the embodiment of the present invention, the proxy server periodically initiates registration to the application server of the application program by using the received registration message, where the registration is used to transfer the periodic registration between the mobile terminal and the application server to the proxy server, so that the proxy server maintains a heartbeat connection to and communicates with the application server, thereby reducing signaling of the mobile terminal and avoiding occurrence of a signaling storm. A person skilled in the art may learn that, an IP connection needs to be established between the proxy server and the application server to perform the registration, and the specific process of establishing an IP connection belongs to the prior art, so the details are not repeated herein.

404: The proxy server registers with the application server, and sets a heartbeat frequency between the proxy server and the application server according to the registration message.

It should be noted that, the proxy server may set the heartbeat frequency between the proxy server and the application server according to the heartbeat frequency maintained between the mobile terminal and the application server in the registration message, and the heartbeat frequency may also be set by the technical personnel. Preferably, the heartbeat frequency between the proxy server and the application server is higher than the heartbeat frequency between the mobile terminal and the application server. Because the proxy server has a higher processing capability and bandwidth capability than those of the mobile terminal, the real-time quality of data can be improved based on this.

405: The proxy server maintains a heartbeat function of the application program between the proxy server and the application server according to the set heartbeat frequency.

The heartbeat function in this embodiment refers to a two-way heartbeat function from the proxy server to the application server and from the application server to the proxy server. A specific implementation manner of the heartbeat function is identical to that of a two-way heartbeat function between a mobile terminal and an application server in the prior art, that is, a peer end is notified of the update of a local state through an event notification message. The proxy server learns, through the heartbeat message, whether the application server needs to send data to the mobile terminal.

In the embodiment of the present invention, when the application program on the mobile terminal runs in the background, an IP connection of the application program is released. Through the foregoing steps, heartbeat maintaining and data updating functions of the mobile terminal are transferred to the proxy server.

It should be noted that, the heartbeat function may be in a two-way manner. The proxy server sends a heartbeat message to the application server, and the application server also sends a heartbeat message to the proxy server. The proxy server may learn, according to the heartbeat message sent by the application server or a feedback from the application server, whether the application server needs to send data.

In this embodiment, a basic function of the application server serving as the application server is identical to that of an existing application server, and no change is made in the process.

406: The application server sends data to the proxy server.

In this embodiment, when there is data that needs to be sent to the mobile terminal, the application server first sends the data to the proxy server through its heartbeat function, and then the proxy server forwards the data to the mobile terminal.

407: The proxy server receives the data sent by the application server, and determines whether the data to be sent is greater than a preset value, and if yes, perform step 409; if not, perform step 408.

The preset value is set by technical personnel according to a system capability, which is not specifically limited in the embodiment of the present invention.

408: The proxy server sends the data to the mobile terminal through a Push mechanism; and the procedure ends.

In this embodiment, the proxy server switches, through the Push mechanism, the application program on the mobile terminal to the foreground for running, and sends the data to the mobile terminal.

Further, when delivering the data through the Push mechanism, the proxy server may obtain a current online state of the mobile terminal, and reports the obtained online state to the application server, so that the application server updates the state information of the mobile terminal according to the online state report.

409: The proxy server sends an IP connection establishment notification to the mobile terminal; and when receiving an IP connection establishment request from the mobile terminal, the proxy server establishes an IP connection to the mobile terminal, and sends the data to the mobile terminal through the established IP connection.

The process of the mobile terminal receiving the data and running the application program according to the data is similar to steps 211 to 214, so the details are not repeated herein.

In the method provided in this embodiment, in a scenario in which a proxy server is used to keep an application program online, when the application program is switched to a background for running, the proxy server interacts with an application server, so that a mobile terminal does not need to maintain a heartbeat connection to the application server, thereby not only reducing signaling overhead of the mobile terminal, but also reducing energy consumption of the mobile terminal and interaction of network signaling to a great extent.

Figure 5:
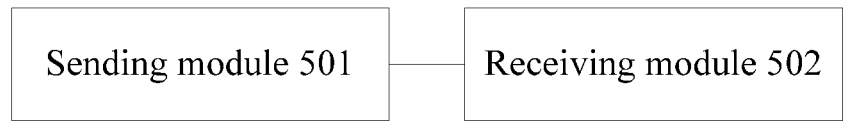
FIG. 5 is a schematic structural diagram of a mobile terminal according to an embodiment of the present invention.

FIG. 5 is a schematic structural diagram of a mobile terminal according to an embodiment of the present invention. Referring to FIG. 5, the mobile terminal includes: a sending module 501 configured to send a first message to a push server when an application program on the mobile terminal is switched to a background, so that the push server sends a second message to an application server, where the second message is used to instruct the application server to send, when there is data that needs to be sent to the mobile terminal, the data to the push server, and the application server serves the application program; and a receiving module 502 configured to receive the data sent by the push server.

The first message carries a user identification of the mobile terminal and an application program identification of the application program.

Figure 6:
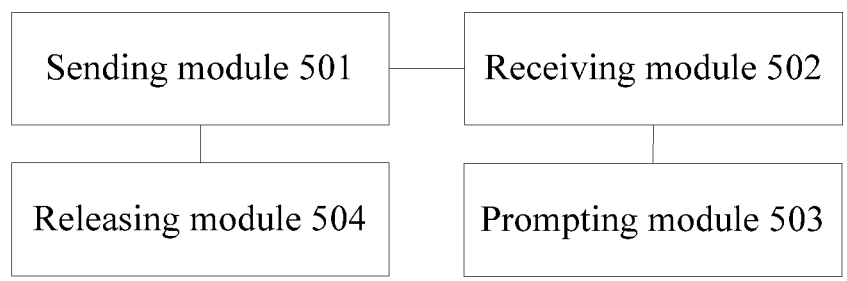
FIG. 6 is a schematic structural diagram of another mobile terminal according to an embodiment of the present invention.

Further, the data carries state information of the application program. FIG. 6 is a schematic structural diagram of another mobile terminal according to an embodiment of the present invention. Referring to FIG. 6, the mobile terminal further includes: a prompting module 503 configured to: when the state information of the application program indicates foreground running, switch the application program to a foreground, and prompt a mobile terminal user about the data; where the prompting module 503 is further configured to: when the state information of the application program indicates background running, store the data, maintain a background running state of the application program until the application program is switched to the foreground, and prompt the mobile terminal user about the data.

Further, the mobile terminal further includes: a releasing module 504 configured to: when the application program on the mobile terminal is switched to the background, release an IP connection between the mobile terminal and the application server serving the application program.

Figure 7:
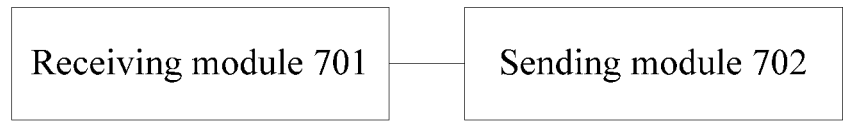
FIG. 7 is a schematic structural diagram of a push server according to an embodiment of the present invention.

FIG. 7 is a schematic structural diagram of a push server according to an embodiment of the present invention. Referring to FIG. 7, the push server includes: a receiving module 701 configured to receive a first message sent by a mobile terminal; and a sending module 702 configured to send a second message to an application server according to the first message, where the second message is used to instruct the application server to send, when there is data that needs to be sent to the mobile terminal, the data to the push server; where the sending module 702 is further configured to send the data to the mobile terminal when receiving the data sent by the application server.

The first message carries a user identification of the mobile terminal and an application program identification of the application program.

Figure 8:
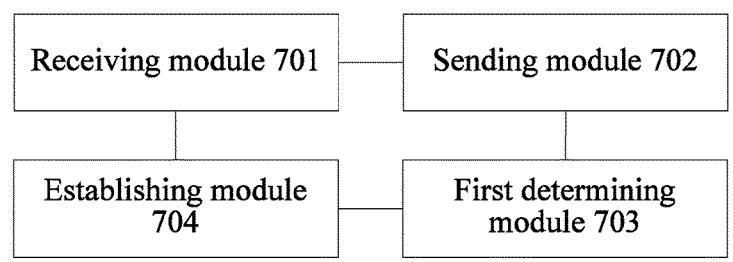
FIG. 8 is a schematic structural diagram of another push server according to an embodiment of the present invention.

FIG. 8 is a schematic structural diagram of another push server according to an embodiment of the present invention. Referring to FIG. 8, the push server includes a receiving module 701 and a sending module 702.

Further, the push server further includes: a first determining module 703 configured to determine whether there is an IP connection between the push server and the mobile terminal; where the sending module 702 is further configured to: when the first determining module determines that there is an IP connection between the push server and the mobile terminal, send the data to the mobile terminal through the IP connection between the push server and the mobile terminal.

The sending module 702 is further configured to send an IP connection establishment notification to the mobile terminal when the first determining module determines that there is no IP connection between the push server and the mobile terminal; and an establishing module 704 configured to establish an IP connection to the mobile terminal when the receiving module receives an IP connection establishment request from the mobile terminal; where the sending module 702 is further configured to send the data to the mobile terminal through the established IP connection.

Figure 9:
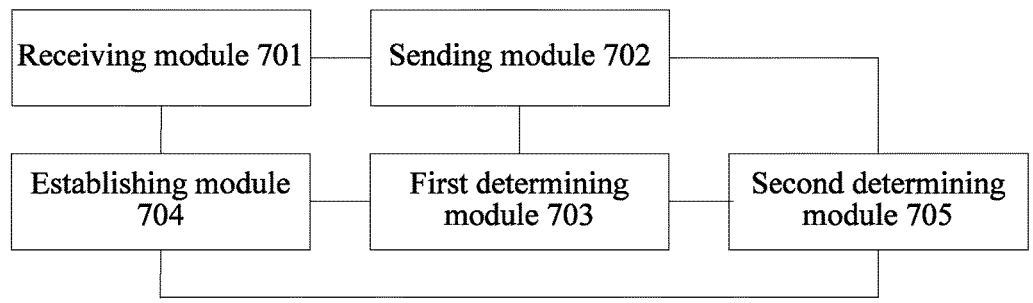
FIG. 9 is a schematic structural diagram of another push server according to an embodiment of the present invention.

FIG. 9 is a schematic structural diagram of another push server according to an embodiment of the present invention.

Referring to FIG. 9, the push server includes a receiving module 701, a sending module 702, and a first determining module 703.

Further, the push server further includes: a second determining module 705 configured to determine whether the data is greater than a preset value when the first determining module 703 determines that there is no IP connection between the push server and the mobile terminal; where the sending module 702 is further configured to send the data to the mobile terminal through a Push mechanism if the second determining module 705 determines that the data is less than the preset value, and the sending module 702 is further configured to send an IP connection establishment notification to the mobile terminal if the second determining module 705 determines that the data is greater than the preset value; and an establishing module 704 configured to establish an IP connection to the mobile terminal when the receiving module receives an IP connection establishment request from the mobile terminal; where the sending module 702 is further configured to send the data to the mobile terminal through the established IP connection.

The push server provided in this embodiment adopts the same concept as the method embodiments. For a specific implementation process, refer to the method embodiments, and the details are not repeated herein.

Figure 10:
FIG. 10 is a schematic structural diagram of an application server according to an embodiment of the present invention.

FIG. 10 is a schematic structural diagram of an application server according to an embodiment of the present invention. Referring to FIG. 10, the application server includes: a receiving module 1001 configured to receive a second message sent by a push server; and a sending module 1002 configured to: when an application program indicated by a user identification and an application program identification needs to send data to a mobile terminal, send the data to the push server according to the second message, so that the push server sends the data to the mobile terminal after receiving the data.

The second message carries the user identification of the mobile terminal.

The application server provided in this embodiment adopts the same concept as the method embodiments. For a specific implementation process, refer to the method embodiments, and the details are not repeated herein.

An embodiment of the present invention provides a network system, and the network system includes: any one of the foregoing mobile terminals configured to send a first message to a push server when an application program on the mobile terminal is switched to a background, so that the push server sends a second message to an application server, where the second message is used to instruct the application server to send, when there is data that needs to be sent to the mobile terminal, the data to the push server, and the application server serves the application program; and receive the data sent by the push server; any one of the foregoing push servers configured to receive the first message sent by the mobile terminal; send the second message to the application server according to the first message, where the second message is used to instruct the application server to send, when there is data that needs to be sent to the mobile terminal, the data to the push server; and send the data to the mobile terminal when receiving the data sent by the application server; and any one of the foregoing application servers configured to receive the second message sent by the push server; and when an application program indicated by a user identification and an application program identification needs to send data to the mobile terminal, send the data to the push server according to the second message, so that the push server sends the data to the mobile terminal after receiving the data.

Figure 11:
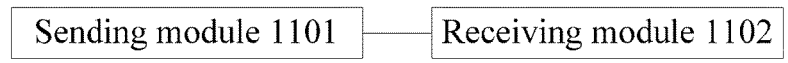
FIG. 11 is a schematic structural diagram of a mobile terminal according to an embodiment of the present invention.

FIG. 11 is a schematic structural diagram of a mobile terminal according to an embodiment of the present invention. Referring to FIG. 11, the mobile terminal includes: a sending module 1101 configured to send a registration message to a proxy server when an application program on a mobile terminal is switched to a background, so that the proxy server maintains a heartbeat connection to an application server according to the registration message and receives data to be delivered by the application server to the mobile terminal, where the application server serves the application program; and a receiving module 1102 configured to receive the data forwarded by the proxy server.

The registration message carries a user identification of the mobile terminal and an application program identification of the application program.

Figure 12:
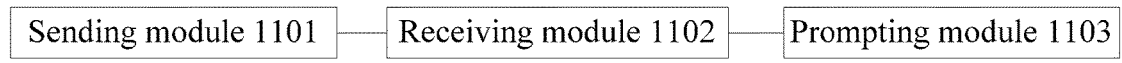
FIG. 12 is a schematic structural diagram of a mobile terminal according to an embodiment of the present invention.

The data carries state information of the application program, and correspondingly, referring to FIG. 12, the mobile terminal includes: a prompting module 1103 configured to: when the state information of the application program indicates foreground running, switch the application program to a foreground, and prompt a mobile terminal user about the data; where the prompting module 1103 is further configured to: when the state information of the application program indicates background running, store the data, maintain a background running state of the application program until the application program is switched to the foreground, and prompt the mobile terminal user about the data.

Figure 13:
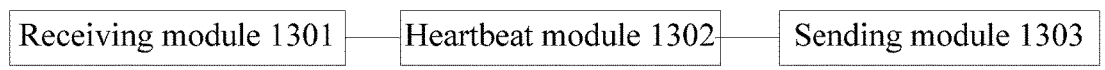
FIG. 13 is a schematic structural diagram of a proxy server according to an embodiment of the present invention.

FIG. 13 is a schematic structural diagram of a proxy server according to an embodiment of the present invention. Referring to FIG. 13, the proxy server includes: a receiving module 1301 configured to receive a registration message sent by a mobile terminal; a heartbeat module 1302 configured to maintain a heartbeat connection to an application server according to the registration message; and a sending module 1303 configured to send the data to the mobile terminal after receiving data sent by the application server.

The registration message carries a user identification of the mobile terminal and an application program identification of the application program.

The heartbeat module 1302 includes: a registration unit configured to register with the application server according to the registration message; and a heartbeat unit configured to maintain the heartbeat connection of the application program to the application server.

Figure 14:
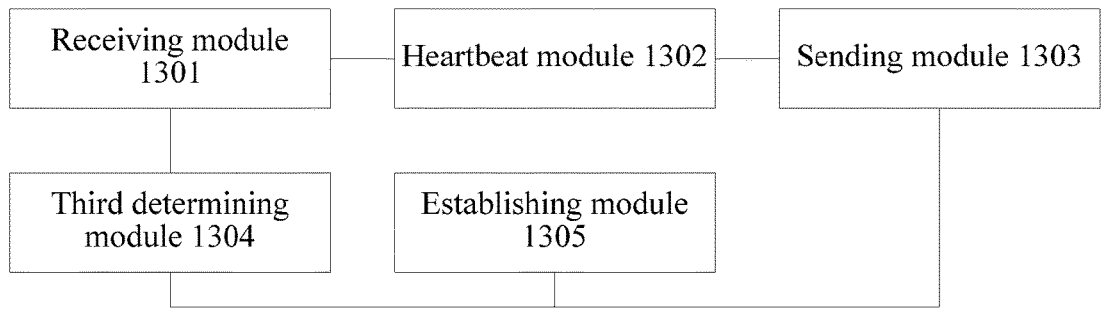
FIG. 14 is a schematic structural diagram of another proxy server according to an embodiment of the present invention.

FIG. 14 is a schematic structural diagram of another proxy server according to an embodiment of the present invention. Referring to FIG. 14, the proxy server includes a receiving module 1301, a heartbeat module 1302, and a sending module 1303.

The proxy server further includes: a third determining module 1304 configured to determine whether there is an IP connection between the proxy server and the mobile terminal after the data sent by the application server is received; where the sending module 1303 is further configured to: if the third determining module determines that there is an IP connection between the proxy server and the mobile terminal, send data to the mobile terminal through the IP connection between the proxy server and the mobile terminal.

The sending module 1303 is further configured to send an IP connection establishment notification to the mobile terminal if the third determining module determines that there is no IP connection between the proxy server and the mobile terminal; and the proxy server further includes: an establishing module 1305 configured to establish an IP connection to the mobile terminal when the receiving module receives an IP establishment request from the mobile terminal; where the sending module 1303 is further configured to send the data to the mobile terminal through the established IP connection.

Figure 15:
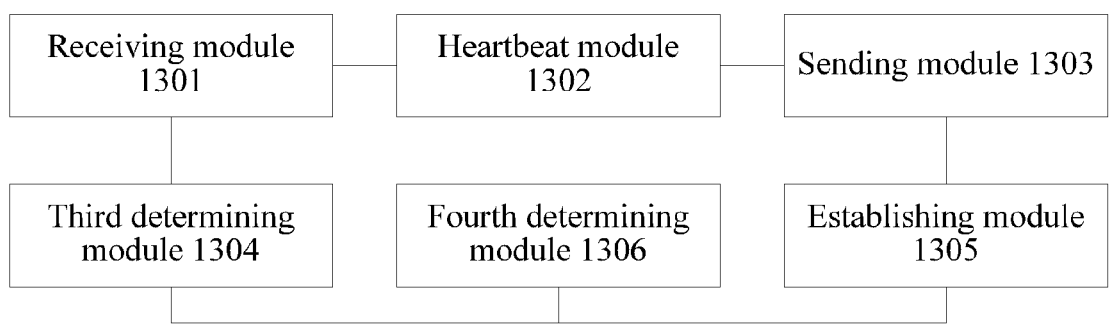
FIG. 15 is a schematic structural diagram of another proxy server according to an embodiment of the present invention.

FIG. 15 is a schematic structural diagram of another proxy server according to an embodiment of the present invention. Referring to FIG. 15, the proxy server includes a receiving module 1301, a heartbeat module 1302, a sending module 1303, a third determining module 1304, a fourth determining module 1306 configured to determine whether the data is greater than a preset value if the third determining module 1304 determines that there is no IP connection between the proxy server and the mobile terminal; where the sending module 1303 is configured to enable the proxy server to send the data to the mobile terminal through a Push mechanism if the fourth determining module determines that the data is less than the preset value, and the sending module 1303 is further configured to send an IP connection establishment notification to the mobile terminal if the fourth determining module determines that the data is greater than or equal to the preset value; and an establishing module 1305 configured to establish an IP connection to the mobile terminal when the receiving module receives an IP establishment request from the mobile terminal; where the sending module 1303 is further configured to send the data to the mobile terminal through the established IP connection.

The proxy server provided in this embodiment adopts the same concept as the method embodiments. For a specific implementation process, refer to the method embodiments, and the details are not repeated herein.

An embodiment of the present invention provides a network system, and the network system includes: a mobile terminal configured to send a registration message to a proxy server when an application program on the mobile terminal is switched to a background, so that the proxy server maintains a heartbeat connection to an application server according to the registration message and receives data to be delivered by the application server to the mobile terminal, where the application server serves the application program; and receive the data forwarded by the proxy server; the proxy server configured to receive the registration message sent by the mobile terminal; maintain the heartbeat connection to the application server according to the registration message; and send the data to the mobile terminal when receiving the data sent by the application server; and the application server configured to send the data to the proxy server.

A person of ordinary skill in the art may understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disc.

The foregoing descriptions are merely exemplary embodiments of the present invention, but are not intended to limit the present invention. Any modifications, equivalent replacements, or improvements made within the spirit and principle of the present invention shall fall within the protection scope of the present invention.

What is claimed is:

1. A method for receiving data, comprising:
   sending, by a mobile terminal, a first message to a push server such that the push server sends a second message to an application server when an application program on the mobile terminal is switched to a background, wherein the second message is used to instruct the application server to send, when there is data that needs to be sent to the mobile terminal, the data to the push server, wherein the application server serves the application program, wherein a heartbeat connection between the mobile terminal and the application server is discontinued when the application program on the mobile terminal is switched to the background, wherein a heartbeat connection between the push server and the application server is continued when the application program on the mobile terminal is switched to the background, and wherein a heartbeat frequency between the push server and the application server is higher than a heartbeat frequency between the mobile terminal and the application server;
   receiving, by the mobile terminal, the data sent by the push server through a Push mechanism when the data is less than a preset value; and
   receiving, by the mobile terminal, the data sent by the push server through an Internet Protocol (IP) connection when the data is greater than or equal to the preset value.

2. The method according to claim 1, wherein the first message carries a user identification of the mobile terminal and an application program identification of the application program.

3. The method according to claim 1, wherein the data carries state information of the application program, and correspondingly, after receiving, by the mobile terminal, the data sent by the push server, the method comprises:
   switching, by the mobile terminal, the application program to a foreground when the state information of the application program indicates foreground running;
   prompting a mobile terminal user about the data;
   storing, by the mobile terminal, the data when the state information of the application program indicates background running;
   maintaining a background running state of the application program until the application program is switched to the foreground when the state information of the application program indicates background running; and
   prompting the mobile terminal user about the data when the state information of the application program indicates background running.

4. The method according to claim 1, further comprising releasing an IP connection between the mobile terminal and the application server serving the application program when the application program on the mobile terminal is switched to the background.

5. A method for sending data, comprising:
   receiving, by a push server, a first message sent by a mobile terminal;
   sending, by the push server, a second message to an application server according to the first message, wherein the second message is used to instruct the application server to send, when there is data that needs to be sent to the mobile terminal, the data to the push server, wherein a heartbeat connection between the mobile terminal and the application server is discontinued when an application program on the mobile terminal is switched to a background, wherein a heartbeat connection between the push server and the application server is continued when the application program on the mobile terminal is switched to the background, and wherein a heartbeat frequency between the push server and the application server is higher than a heartbeat frequency between the mobile terminal and the application server;
determining whether the data is greater than a preset value;
sending, by the push server, the data to the mobile terminal through a Push mechanism when the data is less than the preset value; and
sending, by the push server, the data to the mobile terminal through an Internet Protocol (IP) connection when the data is greater than or equal to the preset value.

6. The method according to claim 5, wherein the first message carries a user identification of the mobile terminal and an application program identification of the application program.

7. The method according to claim 5, wherein sending, by the push server the data to the mobile terminal through an IP connection when the data is greater than the preset value comprises:
determining whether there is the IP connection between the push server and the mobile terminal after the push server receives the data sent by the application server; and
sending the data to the mobile terminal through the IP connection between the push server and the mobile terminal when there is the IP connection between the push server and the mobile terminal.

8. A method for sending data, comprising:
receiving, by an application server, a second message sent by a push server; and
sending, by the application server, when there is data that needs to be sent to a mobile terminal, the data to the push server according to the second message such that the push server sends the data to the mobile terminal after receiving the data,
wherein a heartbeat connection between the mobile terminal and the application server is discontinued when an application program on the mobile terminal is switched to a background,
wherein a heartbeat connection between the push server and the application server is continued when the application program on the mobile terminal is switched to the background,
wherein a heartbeat frequency between the push server and the application server is higher than a heartbeat frequency between the mobile terminal and the application server,
wherein the push server sends the data to the mobile terminal through a Push mechanism when the data is less than a preset value, and
wherein the push server sends the data to the mobile terminal through an Internet Protocol (IP) connection when the data is greater than or equal to the preset value.

9. The method according to claim 8, wherein the second message carries a user identification of the mobile terminal.

10. A mobile terminal, comprising:
a transmitter configured to send a first message to a push server when an application program on the mobile terminal is switched to a background such that the push server sends a second message to an application server, wherein the second message is used to instruct the application server to send, when there is data that needs to be sent to the mobile terminal, the data to the push server, wherein the application server serves the application program, wherein a heartbeat connection between the mobile terminal and the application server is discontinued when the application program on the mobile terminal is switched to the background, wherein a heartbeat connection between the push server and the application server is continued when the application program on the mobile terminal is switched to the background, and wherein a heartbeat frequency between the push server and the application server is higher than a heartbeat frequency between the mobile terminal and the application server; and
a receiver configured to receive the data sent by the push server,
wherein the receiver receives the data from the push server through a Push mechanism when the data is less than a preset value, and
wherein the receiver receives the data from the push server through an Internet Protocol (IP) connection when the data is greater than or equal to the preset value.

11. The mobile terminal according to claim 10, wherein the first message carries a user identification of the mobile terminal and an application program identification of the application program.

12. The mobile terminal according to claim 10, wherein the data carries state information of the application program, and wherein the mobile terminal further comprises a computer processor coupled to the transmitter and the receiver and configured to:
switch the application program to a foreground, and prompt a mobile terminal user about the data when the state information of the application program indicates foreground running;
store the data when the state information of the application program indicates background running;
maintain a background running state of the application program until the application program is switched to the foreground when the state information of the application program indicates background running; and
prompt the mobile terminal user about the data when the state information of the application program indicates background running.

13. The mobile terminal according to claim 10, further comprising a computer processor coupled to the transmitter and the receiver and configured to release an IP connection between the mobile terminal and the application server serving the application program when the application program on the mobile terminal is switched to the background.

14. A push server, comprising:
a receiver configured to receive a first message sent by a mobile terminal; and
a transmitter configured to:
send a second message to an application server according to the first message, wherein the second message is used to instruct the application server to send, when there is data that needs to be sent to the mobile terminal, the data to the push server, wherein a heartbeat connection between the mobile terminal and the application server is discontinued when an application program on the mobile terminal is switched to a background, wherein a heartbeat connection between the push server and the application server is continued when the application program on the mobile terminal is switched to the background, and wherein a heartbeat frequency between the push server and the application server is higher than a heartbeat frequency between the mobile terminal and the application server;

send the data to the mobile terminal when receiving the data sent by the application server through a Push mechanism when the data is less than a preset value; and send the data to the mobile terminal when receiving the data sent by the application server through an Internet Protocol (IP) connection when the data is greater than or equal to the preset value.

15. The push server according to claim 14, wherein the first message carries a user identification of the mobile terminal and an application program identification of the application program.

16. The push server according to claim 14, further comprising a computer processor coupled to the transmitter and the receiver and configured to determine whether there is the IP connection between the push server and the mobile terminal, and wherein the transmitter is further configured to send the data to the mobile terminal through the IP connection between the push server and the mobile terminal when the first determining module determines that there is the IP connection between the push server and the mobile terminal.

17. The push server according to claim 16, wherein the transmitter is further configured to send an IP connection establishment notification to the mobile terminal when the computer processor determines that there is no IP connection between the push server and the mobile terminal, wherein the computer processor is configured to establish an IP connection to the mobile terminal when the receiver receives an IP connection establishment request from the mobile terminal, and wherein the transmitter is further configured to send the data to the mobile terminal through the established IP connection.

18. An application server, comprising:
a receiver configured to receive a second message sent by a push server; and
a transmitter configured to, when an application program indicated by a user identification and an application program identification needs to send data to the mobile terminal, send the data to the push server according to the second message such that the push server sends the data to the mobile terminal after receiving the data,
wherein a heartbeat connection between the mobile terminal and the application server is discontinued when the application program on the mobile terminal is switched to a background,
wherein a heartbeat connection between the push server and the application server is continued when the application program on the mobile terminal is switched to the background,
wherein a heartbeat frequency between the push server and the application server is higher than a heartbeat frequency between the mobile terminal and the application server,
wherein the push server sends the data to the mobile terminal through a Push mechanism when the data is less than a preset value, and
wherein the push server sends the data to the mobile terminal through an Internet Protocol (IP) connection when the data is greater than or equal to the preset value.

19. The application server according to claim 18, wherein the second message carries the user identification of the mobile terminal.

20. A network system, comprising:
a push server; and
a mobile terminal configured to send a first message to a push server when an application program on the mobile terminal is switched to a background such that the push server sends a second message to an application server, wherein the second message is used to instruct the application server o send the data to the push server when there is data that needs to be sent to the mobile terminal, and wherein the application server serves the application program and receives the data sent by the push server,
wherein the push server is configured to:
receive the first message sent by the mobile terminal;
send the second message to the application server according to the first message, wherein the second message is used to instruct the application server to send the data to the push server when there is data that needs to be sent to the mobile terminal; and
send the data to the mobile terminal when receiving the data sent by the application server,
wherein the push server sends the data to the mobile terminal through a Push mechanism when the data is less than a preset value,
wherein the push server sends the data to the mobile terminal through an Internet Protocol (IP) connection when the data is greater than or equal to the preset value, and
wherein the application server is configured to:
receive the second message sent by the push server; and
send the data to the push server according to the second message such that the push server sends the data to the mobile terminal after receiving the data when an application program indicated by a user identification and an application program identification needs to send data to the mobile terminal,
wherein a heartbeat connection between the mobile terminal and the application server is discontinued when the application program on the mobile terminal is switched to a background,
wherein a heartbeat connection between the push server and the application server is continued when the application program on the mobile terminal is switched to the background, and
wherein a heartbeat frequency between the push server and the application server is higher than a heartbeat frequency between the mobile terminal and the application server.

21. A method for receiving data, comprising:
sending, by a mobile terminal, a registration message to a proxy server when an application program on the mobile terminal is switched to a background such that the proxy server maintains a heartbeat connection to an application server according to the registration message and receives data to be delivered by the application server to the mobile terminal, wherein the application server serves the application program, wherein a heartbeat connection between the mobile terminal and the application server is discontinued when the application program on the mobile terminal is switched to the background, wherein the heartbeat connection between the proxy server and the application server is continued when the application program on the mobile terminal is switched to the background, and wherein a heartbeat frequency between the proxy server and the application server is higher than a heartbeat frequency between the mobile terminal and the application server;
receiving, by the mobile terminal, the data forwarded by the proxy server through a Push mechanism when the data is less than a preset value; and receiving, by the mobile terminal, the data forwarded by the proxy server through an Internet Protocol (IP) connection when the data is greater than or equal to the preset value.

22. The method according to claim 21, wherein the registration message carries a user identification of the mobile terminal and an application program identification of the application program.

23. The method according to claim 21, wherein the data carries state information of the application program, and wherein after receiving, by the mobile terminal, the data sent by the proxy server, the method comprises:
   switching, by the mobile terminal, the application program to a foreground when the state information of the application program indicates foreground running;
   prompting a mobile terminal user about the data when the state information of the application program indicates foreground running;
   storing, by the mobile terminal, the data when the state information of the application program indicates background running;
   maintaining a background running state of the application program until the application program is switched to the foreground when the state information of the application program indicates background running; and
   prompting the mobile terminal user about the data when the state information of the application program indicates background running.

24. A method for sending data, comprising:
   receiving, by a proxy server, a registration message sent by a mobile terminal;
   maintaining, by the proxy server, a heartbeat connection to an application server according to the registration message; and
   sending, by the proxy server, the data to the mobile terminal after receiving data sent by the application server,
   wherein a heartbeat connection between the mobile terminal and the application server is discontinued when an application program on the mobile terminal is switched to a background,
   wherein the heartbeat connection between the proxy server and the application server is continued when the application program on the mobile terminal is switched to the background
   wherein a heartbeat frequency between the proxy server and the application server is higher than a heartbeat frequency between the mobile terminal and the application server,
   wherein the proxy server sends the data to the mobile terminal through a Push mechanism when the data is less than a preset value, and
   wherein the proxy server sends the data to the mobile terminal through an Internet Protocol (IP) connection when the data is greater than or equal to the preset value.

25. The method according to claim 24, wherein the registration message carries a user identification of the mobile terminal and an application program identification of the application program.

26. The method according to claim 24, wherein maintaining, by the proxy server, the heartbeat connection to the application server according to the registration message further comprises:
   registering, by the proxy server, with the application server according to the registration information; and
   maintaining the heartbeat connection of the application program to the application server.

27. The method according to claim 24, wherein sending, by the proxy server, the data to the mobile terminal after receiving the data sent by the application server specifically comprises:
   determining whether there is the IP connection between the proxy server and the mobile terminal after the proxy server receives the data sent by the application server; and
   sending the data to the mobile terminal through the IP connection between the proxy server and the mobile terminal when there is the IP connection between the proxy server and the mobile terminal.

28. A mobile terminal, comprising:
   a transmitter configured to send a registration message to a proxy server when an application program on the mobile terminal is switched to a background such that the proxy server maintains a heartbeat connection to an application server according to the registration message and receives data to be delivered by the application server to the mobile terminal, wherein the application server serves the application program, wherein a heartbeat connection between the mobile terminal and the application server is discontinued when the application program on the mobile terminal is switched to the background, wherein the heartbeat connection between the proxy server and the application server is continued when the application program on the mobile terminal is switched to the background, and wherein a heartbeat frequency between the proxy server and the application server is higher than a heartbeat frequency between the mobile terminal and the application server; and
   a receiver configured to receive the data forwarded by the proxy server,
   wherein the receiver receives the data forwarded by the proxy server through a Push mechanism when the data is less than a preset value, and
   wherein the receiver receives the data forwarded by the proxy server through an Internet Protocol (IP) connection when the data is greater than or equal to the preset value.

29. The mobile terminal according to claim 28, wherein the registration message carries a user identification of the mobile terminal and an application program identification of the application program.

30. The mobile terminal according to claim 28, wherein the data carries state information of the application program, and correspondingly, the mobile terminal comprises:
   a computer processor configured to:
      switch the application program to a foreground when the state information of the application program indicates foreground running;
      prompt a mobile terminal user about the data when the state information of the application program indicates foreground running;
      store the data when the state information of the application program indicates background running;
      maintain a background running state of the application program until the application program is switched to the foreground when the state information of the application program indicates background running; and
      prompt the mobile terminal user about the data when the state information of the application program indicates background running.

31. A proxy server, comprising;
a non-transitory computer-readable medium having instructions stored thereon; and
a computer processor coupled to the non-transitory computer-readable medium and configured to execute the instructions to:
  receive a registration message sent by a mobile terminal;
  maintain a heartbeat connection to an application, server according to the registration message; and
  send data to the mobile terminal after receiving data sent by the application server,
wherein a heartbeat connection between the mobile terminal and the application server is discontinued when an application program on the mobile terminal is switched to a background,
wherein the heartbeat connection between the proxy server and the application server is continued when the application program on the mobile terminal is switched to the background,
wherein a heartbeat frequency between the proxy server and the application server is higher than a heartbeat frequency between the mobile terminal and the application server,
wherein the data is sent to the mobile terminal through a Push mechanism when the data is less than a preset value, and
wherein the data is sent to the mobile terminal through an Internet Protocol (IP) connection when the data is greater than or equal to the preset value.

32. The proxy server according to claim 31, wherein the registration message carries a user identification of the mobile terminal and an application program identification of the application program.

33. The proxy server according to claim 31, wherein the computer processor is configured to execute the instructions to:
  register with the application server according to the registration information; and
  maintain the heartbeat connection of the application program to the application server.

34. The proxy server according to claim 31, wherein the computer processor is configured to execute the instructions to:
  determine whether there is an IP connection between the proxy server and the mobile terminal after the data sent by the application server is received; and
  send the data to the mobile terminal through the IP connection between the proxy server and the mobile terminal when there is the IP connection between the proxy server and the mobile terminal.

35. The proxy server according to claim 34, wherein the computer processor is configured to execute the instructions to:
  send an IP connection establishment notification to the mobile terminal when there is no IP connection between the proxy server and the mobile terminal;
  establish an IP connection to the mobile terminal when the receiving module receives an IP establishment request from the mobile terminal; and
  send the data to the mobile terminal through the established IP connection.

36. The method according to claim 1, further comprising:
  storing, by the mobile terminal, the data sent by the push server while the application program on the mobile terminal is switched to the background; and
  prompting, by the mobile terminal, a user of the mobile terminal about the data sent by the push server when the application program on the mobile terminal is switched to the foreground.

37. The mobile terminal according to claim 10, wherein the mobile terminal stores the data sent by the push server while the application program on the mobile terminal is switched to the background, and wherein the mobile terminal prompts a user of the mobile terminal about the data sent by the push server when the application program on the mobile terminal is switched to the foreground.

38. The network system according to claim 20, wherein the mobile terminal stores the data sent by the push server while the application program on the mobile terminal is switched to the background, and wherein the mobile terminal prompts a user of the mobile terminal about the data sent by the push server when the application program on the mobile terminal is switched to the foreground.

* * * * *

UNITED STATES PATENT AND TRADEMARK OFFICE
CERTIFICATE OF CORRECTION

PATENT NO. : 9,712,632 B2  
APPLICATION NO. : 14/145496  
DATED : July 18, 2017  
INVENTOR(S) : Guoqiao Chen Page 1 of 1

It is certified that error appears in the above-identified patent and that said Letters Patent is hereby corrected as shown below:

Page 2, Other Publications should read:
Ljung P., "Opportunities for Energy Savings in Mobile Devices," 2011 IEEE 22nd International Symposium on Personal, Indoor and Mobile Radio Communications, XP32102350, Sep. 11-14, 2011, pp. 2394-2401.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*